(12) United States Patent
Srinivasan

(10) Patent No.: US 7,471,850 B2
(45) Date of Patent: Dec. 30, 2008

(54) REVERSIBLE TRANSFORM FOR LOSSY AND LOSSLESS 2-D DATA COMPRESSION

(75) Inventor: Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 11/015,707

(22) Filed: Dec. 17, 2004

(65) Prior Publication Data

US 2006/0133683 A1     Jun. 22, 2006

(51) Int. Cl.
*G06K 9/40*     (2006.01)
(52) U.S. Cl. .................. 382/276; 382/232; 375/240.18
(58) Field of Classification Search ......... 382/232–233, 382/240, 248, 250, 276; 375/240.03, 240.18, 375/240.19
See application file for complete search history.

(56) References Cited

U.S. PATENT DOCUMENTS

| | | | |
|---|---|---|---|
| 4,754,492 A | 6/1988 | Malvar | |
| 5,297,236 A | 3/1994 | Antill et al. | |
| 5,311,310 A | 5/1994 | Jozawa et al. | |
| 5,384,849 A | 1/1995 | Jeong | |
| 5,805,739 A | 9/1998 | Malvar et al. | |
| 5,822,000 A | 10/1998 | Yoon | |
| 5,850,294 A | 12/1998 | Apostolopoulos et al. | |
| 5,859,788 A | 1/1999 | Hou | |
| 5,933,522 A | 8/1999 | Sugimoto | |
| 5,933,541 A | 8/1999 | Kutka et al. | |
| 5,970,173 A | 10/1999 | Lee et al. | |
| 5,973,755 A | 10/1999 | Gabriel | |
| 5,982,459 A | 11/1999 | Fandrianto et al. | |
| 6,011,625 A | 1/2000 | Glass | |
| 6,029,126 A | 2/2000 | Malvar | |
| 6,064,776 A | 5/2000 | Kikuchi et al. | |
| 6,073,153 A | 6/2000 | Malvar | |
| 6,101,279 A | 8/2000 | Nguyen et al. | |
| 6,115,689 A | 9/2000 | Malvar | |
| 6,154,762 A | 11/2000 | Malvar | |
| 6,219,458 B1 | 4/2001 | Zandi et al. | |
| 6,253,165 B1 | 6/2001 | Malvar | |
| 6,307,887 B1 | 10/2001 | Gabriel | |

(Continued)

FOREIGN PATENT DOCUMENTS

AU     7351001     1/2002

(Continued)

OTHER PUBLICATIONS

Ahmed et al., "Discrete Cosine Transform," IEEE Transactions on Computers, C-23 (Jan. 1974), pp. 90-93.

(Continued)

*Primary Examiner*—Kanji Patel
(74) *Attorney, Agent, or Firm*—Klarquist Sparkman, LLP

(57) ABSTRACT

A 2D transform and its inverse have an implementation as a sequence of lifting steps arranged for reduced computational complexity (i.e., reducing a number of non-trivial operations). This transform pair has energy compaction properties similar to the discrete cosine transform (DCT), and is also lossless and scale-free. As compared to a separable DCT transform implemented as 1D DCT transforms applied separably to rows and columns of a 2D data block, the transforms operations are re-arranged into a cascade of elementary transforms, including the 2×2 Hadamard transform, and 2×2 transforms incorporating lifting rotations. These elementary transforms have implementations as a sequence of lifting operations.

20 Claims, 15 Drawing Sheets

U.S. PATENT DOCUMENTS

| | | | |
|---|---|---|---|
| 6,324,560 | B1 | 11/2001 | Malvar |
| 6,370,502 | B1 | 4/2002 | Wu et al. |
| 6,393,061 | B1 | 5/2002 | Owechko |
| 6,393,156 | B1 | 5/2002 | Nguyen et al. |
| 6,421,464 | B1 * | 7/2002 | Tran et al. .................. 382/232 |
| 6,487,574 | B1 | 11/2002 | Malvar |
| 6,496,795 | B1 | 12/2002 | Malvar |
| 6,587,588 | B1 * | 7/2003 | Bottou et al. ............... 382/240 |
| 6,728,315 | B2 | 4/2004 | Haskell et al. |
| 6,728,316 | B2 | 4/2004 | Enficiaud et al. |
| 6,763,068 | B2 | 7/2004 | Oktem |
| 6,771,828 | B1 | 8/2004 | Malvar |
| 6,771,829 | B1 | 8/2004 | Topiwala et al. |
| 6,865,229 | B1 | 3/2005 | Pronkine |
| 7,006,699 | B2 | 2/2006 | Malvar |
| 7,050,504 | B2 | 5/2006 | Joch et al. |
| 7,106,797 | B2 | 9/2006 | Malvar |
| 7,110,610 | B2 | 9/2006 | Malvar |
| 7,116,834 | B2 | 10/2006 | Malvar |
| 7,155,065 | B1 | 12/2006 | Malvar |
| 7,167,522 | B2 | 1/2007 | Webb |
| 7,181,403 | B2 | 2/2007 | Wu et al. |
| 7,275,036 | B2 | 9/2007 | Geiger et al. |
| 2002/0118759 | A1 | 8/2002 | Enficiaud et al. |
| 2003/0128756 | A1 | 7/2003 | Oktem |
| 2003/0152146 | A1 | 8/2003 | Lin |
| 2003/0206582 | A1 | 11/2003 | Srinivasan |
| 2005/0013359 | A1 | 1/2005 | Srinivasan |
| 2006/0133684 | A1 | 6/2006 | Srinivasan et al. |

FOREIGN PATENT DOCUMENTS

| | | |
|---|---|---|
| WO | WO 02/07438 | 1/2002 |

OTHER PUBLICATIONS

Apostolopoulos et al., "Post-processing for very-low-bit-rate video compression," *IEEE Trans. Image Processing*, vol. 8, pp. 1125-1129, Aug. 1999.

Bhaskaran et al., "Image and Video Compression Standards Algorithms and Architectures," 2nd ed., 1997, pp. 192-194.

de Queiroz et al., "Lapped transforms for image compression," *The Handbook on Transforms and Data Compression*, edited by K. R. Rao and P. Yip, CRC Press, pp. 197-265, Oct. 2000.

de Queiroz et al., "Time-Varying Lapped Transforms and Wavelet Packets," *IEEE Transactions on Signal Processing*, vol. 41, No. 12, pp. 3293-3305 (1993).

U.S. Appl. No. 60/341,674, filed Dec. 2001, Lee et al.

U.S. Appl. No. 60/488,710, filed Jul. 2003, Srinivasan et al.

Goel et al., "Pre-processing for MPEG Compression Using Adaptive Spatial Filtering," Proceedings of 1995 IEEE International Conference on Consumer Electronics, 1995, pp. 246-247.

"H.264 & IPTV Over DSL—Enabling New Telco Revenue Opportunities," *White Paper*, Intel/Envivio, May 15, 2004, available at http://www.envivio.com/images/products/H264whitepaper.pdf.

ISO/IEC JTC1/SC29/WG11 N4668, "Coding of Moving Pictures and Audio," Mar. 2002, Title: MPEG-4 Overview—(V.21—Jeju Version), Editor: Rob Koenen (rob.koenen@m4if.org), available at http://www.chiariglione.org/mpeg/standards/mpeg-4/mpeg-4.htm.

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video]," 218 pp. (1995).

ITU-T, "ITU-T Recommendation H.263: Video Coding for Low Bit Rate Communication," 167 pp. (1998).

Jain, "Fundamentals of Digital Image Processing," Chapters 2, 5, and 11, Prentice Hall, 189 pp. (1989).

Joint Video Team (JVT) of ISO/IEC MPEG & ITU-T VCEG, "Joint Final Committee Draft (JFCD) of Joint Video Specification," JVT-D157, 207 pp. (Aug. 2002).

Malvar, "Biorthogonal and Nonuniform Lapped Transforms for Transform Coding with Reduced Blocking and Ringing Artifacts," appeared in *IEEE Transactions on Signal Processing, Special Issue on Multirate Systems, Filter Banks, Wavelets, and Applications*, vol. 46, 29 pp. (1998).

Malvar, "Lapped Transforms for Efficient Transform/Subband Coding," *IEEE Transactions on Acoustics, Speech and Signal Processing*, vol. 38, No. 6, pp. 969-978 (1990).

Malvar, Signal Processing With Lapped Transforms, Norwood, MA: Artech House, pp. iv, vii-xi, 175-219, 264-273, and 353-357 (1992).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Paeth, "A Fast Algorithm for General Raster Rotation," Proceedings of Graphics Interface '86, pp. 77-81, May 1986.

Park et al., "A post processing method for reducing quantization effects in low bit-rate moving picture coding," *IEEE Trans. Circuits Syst.*, Video Technol., vol. 9, pp. 161-171, Feb. 1999.

Printouts of FTP directories from http://ftp3.itu.ch , 8 pp. (downloaded from the World Wide Web on Sep. 20, 2005.)

Proposed SMPTE Standard for Television: VC-1 Compressed Video Bitstream Format and Decoding Process, pp. 1-500, (Aug. 2005).

Rao et al., "Techniques and Standards for Image, Video, and Audio Coding," Englewood Cliffs, NJ: Prentice-Hall (1996).

Reader, "History of MPEG Video Compression—Ver. 4.0," 99 pp., document marked Dec. 16, 2003.

Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).

Tanaka et al., "A Rotation Method for Raster Image Using Skew Transformation," *Proc IEEE Conf on Computer Vision and Pattern Recognition*, pp. 272-277, Jun. 1986.

Tran et al., "Lapped transform based video coding," *Proc. SPIE Applicat. Digital Image Processing XXIV*, San Diego, CA, pp. 319-333, Aug. 2001.

Tran et al., "Lapped Transform via Time-Domain Pre- and Post-Filtering," *IEEE Transactions on Signal Processing*, vol. 51, No. 6, pp. 1557-1571, Jun. 2003.

Tran, "Lapped Transform via Time-Domain Pre- and Post-Processing," 2001 Conference on Information Sciences and Systems, The John Hopkins University, Mar. 21-23, 2001.

Tu, "Context-Based Entropy Coding of Block Transform Coefficients for Image Compression," *IEEE Transactions On Image Processing*, vol. 11, No. 11, pp. 1271-1283, Nov. 2002.

Wien, "Variable Block-Size Transforms for Hybrid Video Coding," Dissertation, 182 pp. (Feb. 2004).

Adams, "Generalized Reversible Integer-to-Integer Transform Framework," 2003 IEEE Pacific Rim Conference on Communications, Computers, and Signal Processing, vol. 2, Aug. 2003, pp. 1000-1003.

Hao et al., "Matrix Factorizations for Reversible Integer Mapping," IEEE Transactions on Signal Processing, vol. 49, Issue 10, Oct. 2001, pp. 2314-2324.

Klausutis et al., "Variable Block Size Adaptive Lapped Transform-based Image Coding," 1997 International Conference on Image Processing (ICIP '97), vol. 3, pp. 686-689 (1997).

* cited by examiner

Figure 2
Prior Art
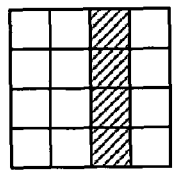
Stage 1: 4 point 1D DCT applied along columns of the 4x4 data matrix.
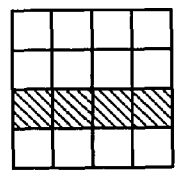
Stage 2: 4 point 1D DCT applied along rows of the 4x4 data matrix.
Figure 3
Prior Art
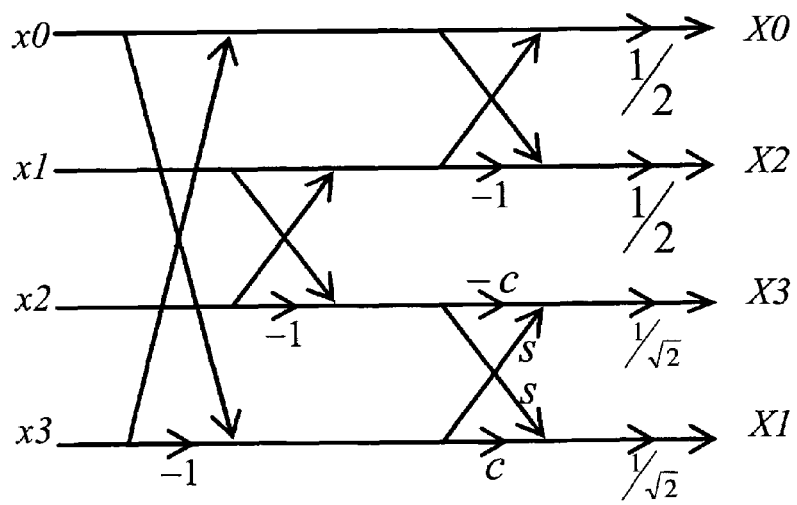

```
T_h (int &a, int &b, int &c, int &d)
{
    a += d;
    b -= c;
    int t1 = (a - b) >> 1;
    int t2 = c;
    c = t1 - d;
    d = t1 - t2;
    a -= d;
    b += c;
    swap (b, c);
}
```

```
T_odd (int &a, int &b, int &c, int &d)
{
    a -= d;
    b += c;
    d += (a + 1) >> 1;
    c -= (b + 1) >> 1;
    /** c-d rotation **/
    d -= (c * 3 + 8) >> 4;
    c += (d * 3 + 4) >> 3;
    d -= (c * 3 + 8) >> 4;
    c = -c;
    /** a-b rotation **/
    swap (a, b);
    a += (b * 3 + 8) >> 4;
    b -= (a * 3 + 4) >> 3;
    a += (b * 3 + 8) >> 4;
    c += (b) >> 1;
    d -= (a + 1) >> 1;
    b -= c;
    a += d;
}
```

```
T_oddodd (int &a, int &b, int &c, int &d)
{
    a -= d;
    b += c;
    d += (a + 1) >> 1;
    c -= (b + 1) >> 1;
    b = -b;
    /** a-b butterfly **/
    a += (b * 3 + 2) >> 3;
    b -= (a * 3 + 0) >> 2;
    a += (b * 3 + 5) >> 3;
    b = -b;
    c += (b + 1) >> 1;
    d -= (a + 1) >> 1;
    b -= c;
    a += d;
}
```

Vertical transform      Horizontal transform

Vertical   Horizontal     Vertical   Horizontal
Stage 1            Stage 2

Figure 20
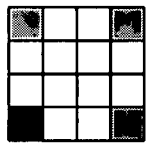
Step 1.1 – $\mathfrak{I}_H$ applied to corners
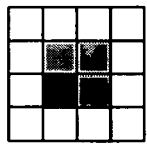
Step 1.2 – $\mathfrak{I}_H$ applied to centers
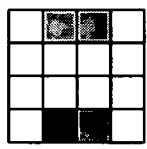
Step 1.3 – $\mathfrak{I}_H$ applied to edges
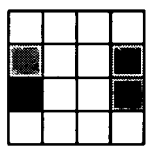
Step 1.4 – $\mathfrak{I}_H$ applied to edges
Figure 21
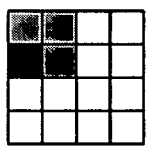
Step 2.1 – $\mathfrak{I}_H$ for even-even basis
Step 2.2 – $\mathfrak{I}_{odd}$ for even-odd basis
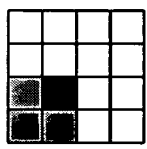
Step 2.3 – $\mathfrak{I}_{odd}$ for odd-even basis
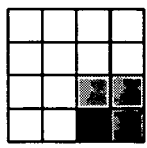
Step 2.4 – $\mathfrak{I}_{odd\text{-}odd}$ for odd-odd basis

Figure 22 2200
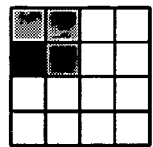
Step 0.1 – $\mathcal{F}_H$ for even-even basis
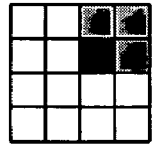
Step 0.2 – Inverse $\mathcal{F}_{odd}$ for even-odd basis
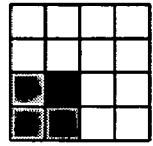
Step 0.3 – Inverse $\mathcal{F}_{odd}$ for odd-even basis
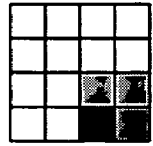
Step 0.4 – Inverse $\mathcal{F}_{odd\text{-}odd}$ for odd-odd basis
Figure 23 2300
| 0 | 2 | 1 | 3 |
|---|---|---|---|
| 8 | 10 | 9 | 11 |
| 4 | 6 | 5 | 7 |
| 12 | 14 | 13 | 15 |

Software 2480 Implementing Improved
Reversible, Scale-free 2D Transform

REVERSIBLE TRANSFORM FOR LOSSY AND LOSSLESS 2-D DATA COMPRESSION

TECHNICAL FIELD

The invention relates generally to block transform-based digital media (e.g., video and image) compression.

BACKGROUND

Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks ($X_1, \ldots X_n$), each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=Mx, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{-1}$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks. The DCT is described by N. Ahmed, T. Nataraj an, and K. R. Rao, "Discrete Cosine Transform," *IEEE Transactions on Computers*, C-23 (January 1974), pp. 90-93. An exemplary implementation of the IDCT is described in "IEEE Standard Specification for the Implementations of 8×8 Inverse Discrete Cosine Transform," *IEEE Std. 1180-1990*, Dec. 6, 1990.

Conventional data transforms used to implement reversible 2D data compressor have generally suffered one or more of the following primary disadvantages, 1. Unequal norms between transform coefficients, requiring complicated entropy coding schemes;
2. Poor approximations to optimal transforms, such as the DCT; and
3. High computational complexity.

Conventional Implementation of 2D Transform

A separable 2D transform is typically implemented by performing 1D transforms on the rows of the data, followed by 1D transform on its columns of data (or vice versa). See, A. K. Jain, Fundamentals of Digital Image Processing, Prentice Hall, 1989. In matrix notation, let T represent the transform matrix and X be the 2D data. The separable 2D transform with T is defined by Y in the following equation.

$$Y = T \times T' \qquad (1)$$

Indeed, the row-wise and column-wise transforms may be distinct. For instance, the data matrix could be non-square (say of size 4×8), or the row-wise and column-wise transforms could be the DCT and discrete sine transform (DST) respectively. In this case, the pre and post multipliers are different (say $T_1$ and $T_2$) and the transform Y is given by $$Y = T_1 \times T_2' \qquad (2)$$

For example, FIG. 2 shows a 2D 4×4 DCT implemented in two stages. In the first stage, the columns of the data matrix are transformed using a 4 point 1D DCT. In the second stage, 4 point 1D DCTs are applied along the rows. With infinite arithmetic accuracy, this ordering may be switched with no change in the output.

The 4 point 1D DCT can be implemented as a sequence of multiplication and addition operations on the 4 input data values, as represented in the signal flow graph shown in FIG. 3. The values c and s in this diagram are respectively cosine and sine of $\pi/8$. The separable transform approach works well for a lossy codec. Lossless codecs are more challenging to realize. Even with unit quantization, the separable 2D DCT described above in conjunction with its separable inverse DCT or IDCT is not guaranteed to produce a bit exact match to the original input. This is because the divisors in FIG. 3 give rise to rounding errors that may not cancel out between the encoder and decoder.

Lifting

In order to achieve lossless compression with a block transform-based codec, it is necessary to replace the above-described 4×4 2D DCT with a lossless transform. A separable transform may be used only if each 1D transform is lossless or reversible. Although multiple choices exist for reversible 1D transforms, those based on "lifting" are by far the most desirable. Lifting is a process of performing a matrix-vector multiplication using successive "shears." A shear is defined as a multiplication of the operand vector with a matrix which is an identity matrix plus one non-zero off-diagonal element. Sign inversion of one or more vector coefficients may occur anywhere during this process, without loss of generality.

Lifting has been implemented through ladder or lattice filter structures in the past. Lifting or successive shear based techniques have been used in graphics. See, A. Tanaka, M. Kameyama, S. Kazama, and O. Watanabe, "A rotation method for raster image using skew transformation," *Proc IEEE Conf on Computer Vision and Pattern Recognition*, pages 272-277, June 1986; and A. W. Paeth, "A fast algorithm for general raster rotation," *Proceedings of Graphics Interface '86*, pages 77-81, May 1986. In fact, it can be argued that Gauss-Jordan elimination is a manifestation of lifting.

One simple 2 point operation is the Hadamard transform, given by the transform matrix $$T_H = \frac{1}{\sqrt{2}}\begin{pmatrix} 1 & 1 \\ 1 & -1 \end{pmatrix}.$$

Two approaches are commonly employed for implementing a lifting-based (reversible) 1D Hadamard transform. The first is to implement the normalized or scale-free Hadamard transform in lifting steps, as shown in FIG. 4. The second approach is to allow the scales to differ between the two transform coefficients, as shown in FIG. 5.

Problems with Lifting

Lifting is not without its problems. In the first Hadamard transform approach shown in FIG. 4, the two transform coefficients are normalized. This is desirable for realizing multi-stage transforms, such as the 4 or 8 point DCT. However, this implementation suffers from two major drawbacks—first, each 2 point Hadamard transform requires three non-trivial (i.e., computationally expensive) lifting steps, and second, rounding errors in the lifting steps cause low pass energy to "leak" into the high frequency term leading to reduced compression efficiency. In this first approach, using the approximation $$\tan\left(\frac{\pi}{8}\right) \approx \frac{3}{8} \text{ and } \cos\left(\frac{\pi}{4}\right) \approx \frac{3}{4}$$

results in the AC basis function [0.75-0.7188]. While the discrepancy from the required [0.7071 0.7071] does not seem overly large, a DC signal of amplitude 64 produces an AC response of 2 units, which leaks into the expensive-to-encode high frequency band.

The second approach (FIG. 5) uses trivial lifting steps. However, the low pass term is scaled up by a factor of $\sqrt{2}$, whereas the high pass term is scaled down by $1/\sqrt{2}$ (or vice versa). The resolution of the two coefficients differs by one bit. In two dimensions, the high-high term is less in resolution by 2 bits compared to the low-low term. Cascaded transform stages only increase this discrepancy. Entropy coding is more difficult to implement due to the differing ranges of the coefficients.

In summary, the problems with lifting based lossless transforms are:

1. Possible unequal scaling between transform coefficients, making for more complex entropy coding mechanisms.
2. Poor approximations to desired transform basis functions that may cause undesirable effects such as the leakage of DC into AC bands.
3. Potentially high computational complexity, especially so if the lifting based implementation is designed to well approximate the desired transform.

SUMMARY

A digital media encoder/decoder system is based on a 2D block transform which has various implementations described herein that address the above-indicated problems and drawbacks of prior art transforms. In particular, a described implementation of the pair of a 2D transform and its inverse has a sequence of lifting steps arranged for reduced computational complexity (i.e., reducing a number of non-trivial operations). This transform pair has energy compaction properties similar to the DCT, and is also lossless and scale-free. The term "lossless" means that the original integer input to the transform can be recovered without error by the inverse transform, from its integer transform coefficients, assuming no quantization. "Scale-free" refers to the transform pair's basis functions being equally scaled, which also means that the resulting transform matrix is orthogonal.

One described implementation of this transform pair is as a 4×4 transform, but can be extended to other sizes as well (e.g., 8×8, etc.). Furthermore, cascades of the transform pair may be used to realize hierarchical pyramids and larger transforms. For instance, one described implementation uses a two level cascade of the transform. In the second transform stage, the transform is applied to the 16 DC coefficients generated within a macroblock. Since the transform is similar to the DCT, it can be used to realize a lossless-to-lossy digital media codec (i.e., a codec whose quantization parameter can be varied from a lossless setting to lossy settings) with superior rate-distortion performance and compression efficiency.

Additional features and advantages of the invention will be made apparent from the following detailed description of embodiments that proceeds with reference to the accompanying drawings.

BRIEF DESCRIPTION OF THE DRAWINGS

FIG. 2 is a block diagram of a 2D 4×4 DCT implemented in two stages, also in the prior art.

FIG. 3 is a signal flow graph of a 1D 4×4 DCT, also in the prior art.

FIG. 20 is a diagram illustrating the points of a 4×4 data block to which the 2×2 Hadamard transform of FIG. 8 is applied in a first stage of an implementation of the improved, reversible 2D transform in the encoder of FIG. 6.

FIG. 21 is a diagram illustrating the points of the 4×4 data block to which the 2×2 Hadamard transform of FIG. 8, the $\mathcal{T}_{odd}$ transform of FIG. 11, and the $\mathcal{T}_{odd\text{-}odd}$ transform of FIG. 14 are applied in a second stage of the implementation of the improved, reversible 2D transform in the encoder of FIG. 6.

FIG. 22 is a diagram illustrating the points of the 4×4 transform coefficients block to which the 2×2 Hadamard transform of FIG. 8, the $\mathcal{T}_{odd}$ transform of FIG. 11, and the $\mathcal{T}_{odd\text{-}odd}$ transform of FIG. 14 are applied in a first stage of the implementation of the inverse 2D transform in the decoder of FIG. 7.

FIG. 23 is a diagram illustrating the ordering of transform coefficients for the forward and inverse 2D transform in the encoder of FIG. 6 and decoder of FIG. 7.

DETAILED DESCRIPTION

The following description relates to a digital media compression system or codec, which utilizes an improved, reversible scale-free 2D transform. For purposes of illustration, an embodiment of a compression system incorporating the improved transform is an image or video compression system. Alternatively, the improved transform also can be incorporated into compression systems or codecs for other 2D data. The transform does not require that the digital media compression system encodes the compressed digital media data in a particular coding format.

1. Encoder/Decoder

Figure 1:
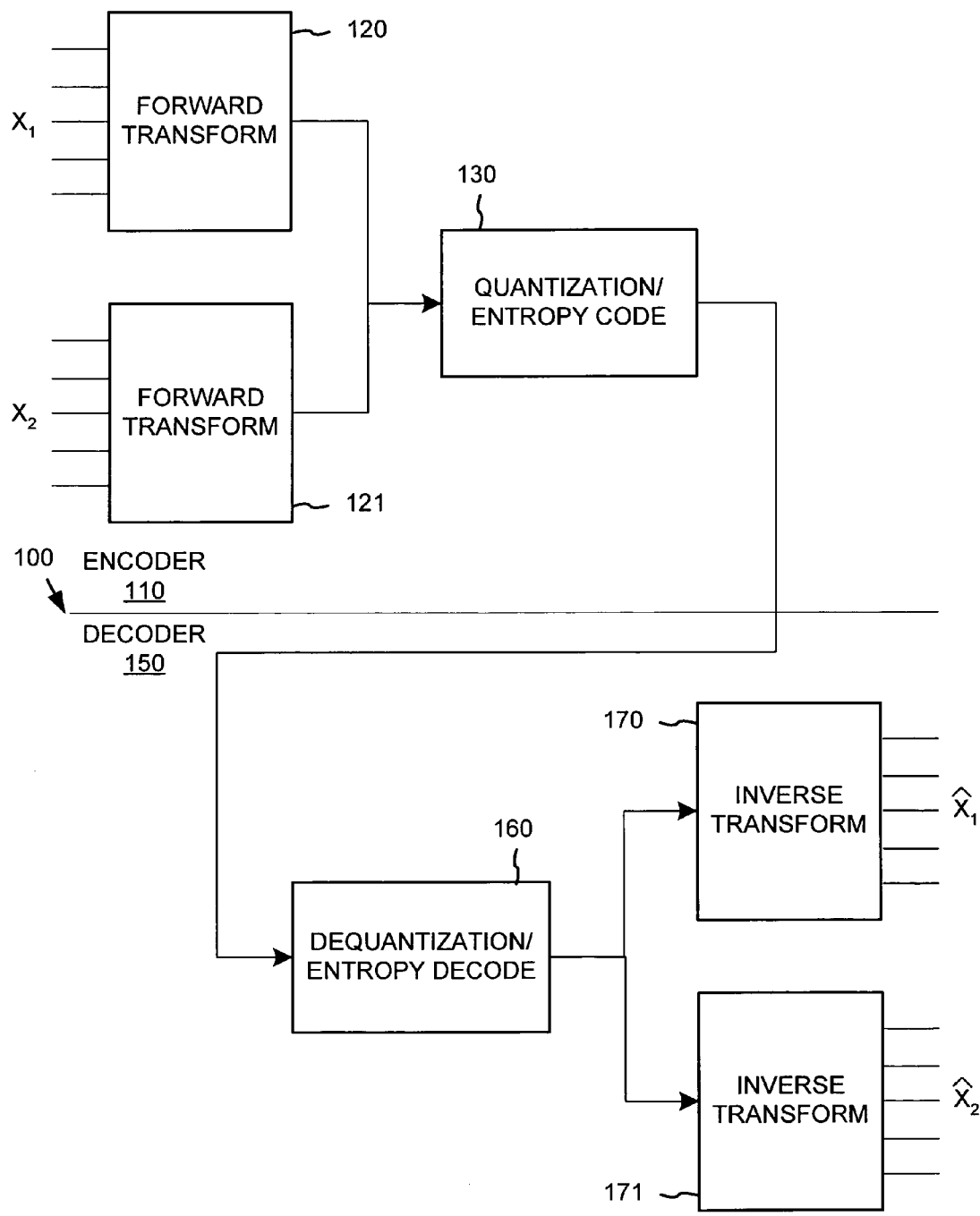
FIG. 1 is a block diagram of a conventional block transform-based codec in the prior art.
Figure 4:
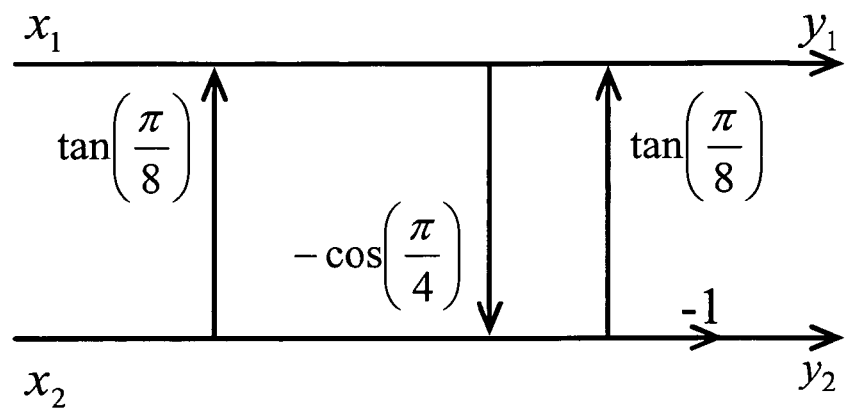
FIG. 4 is a signal flow graph of a normalized 2-point Hadamard transform using lifting, also in the prior art.
Figure 5:
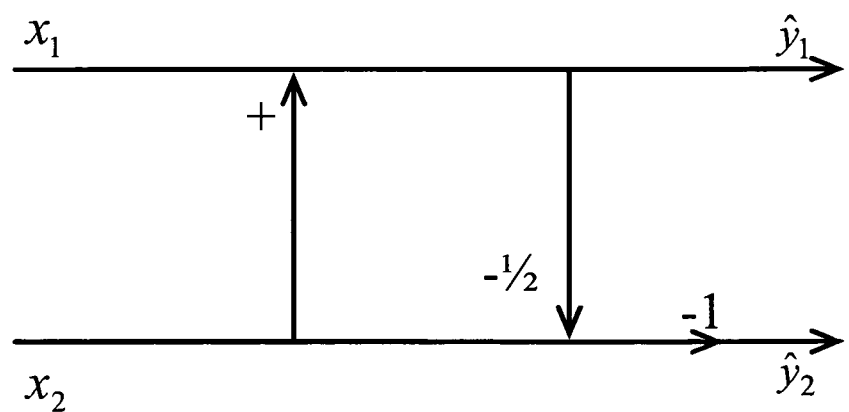
FIG. 5 is a signal flow graph of a trivial 2-point Hadamard transform, also in the prior art.
Figure 6:
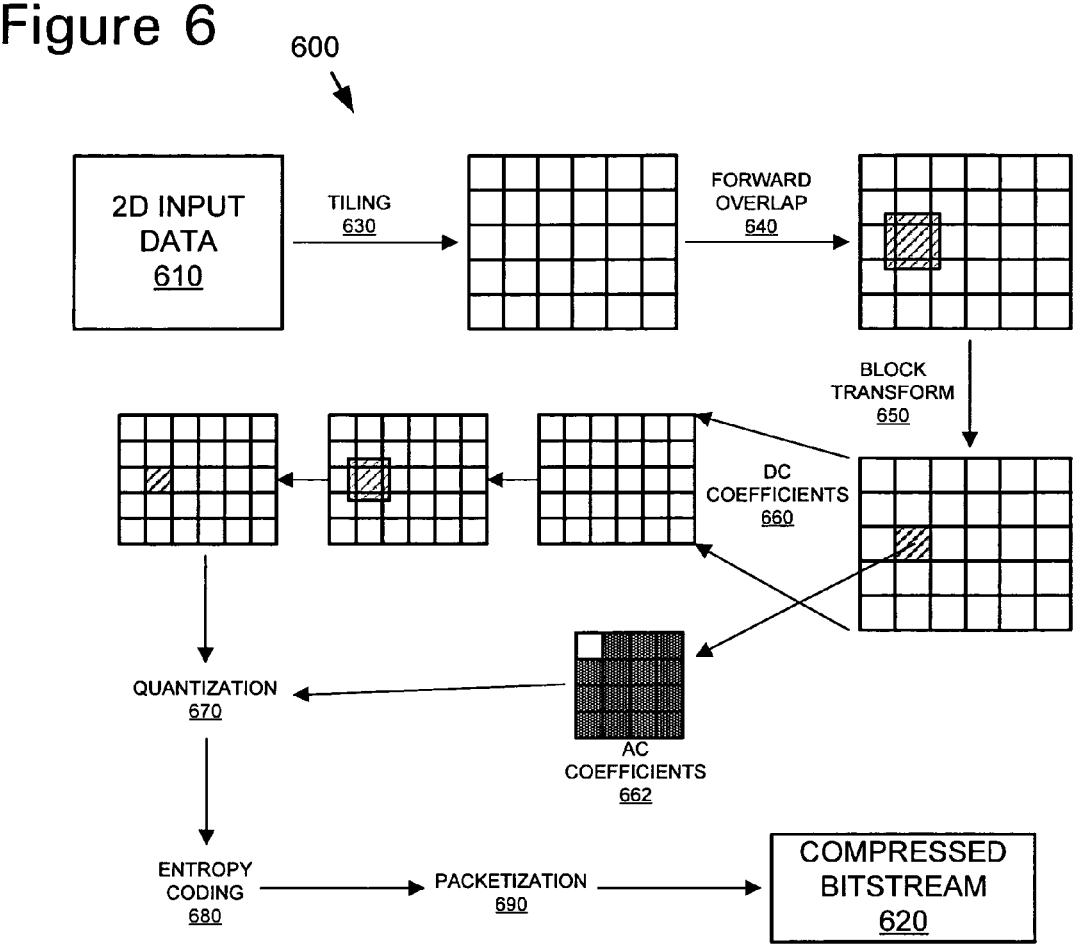
FIG. 6 is a flow diagram of an encoder based on an improved reversible 2D transform.
Figure 7:
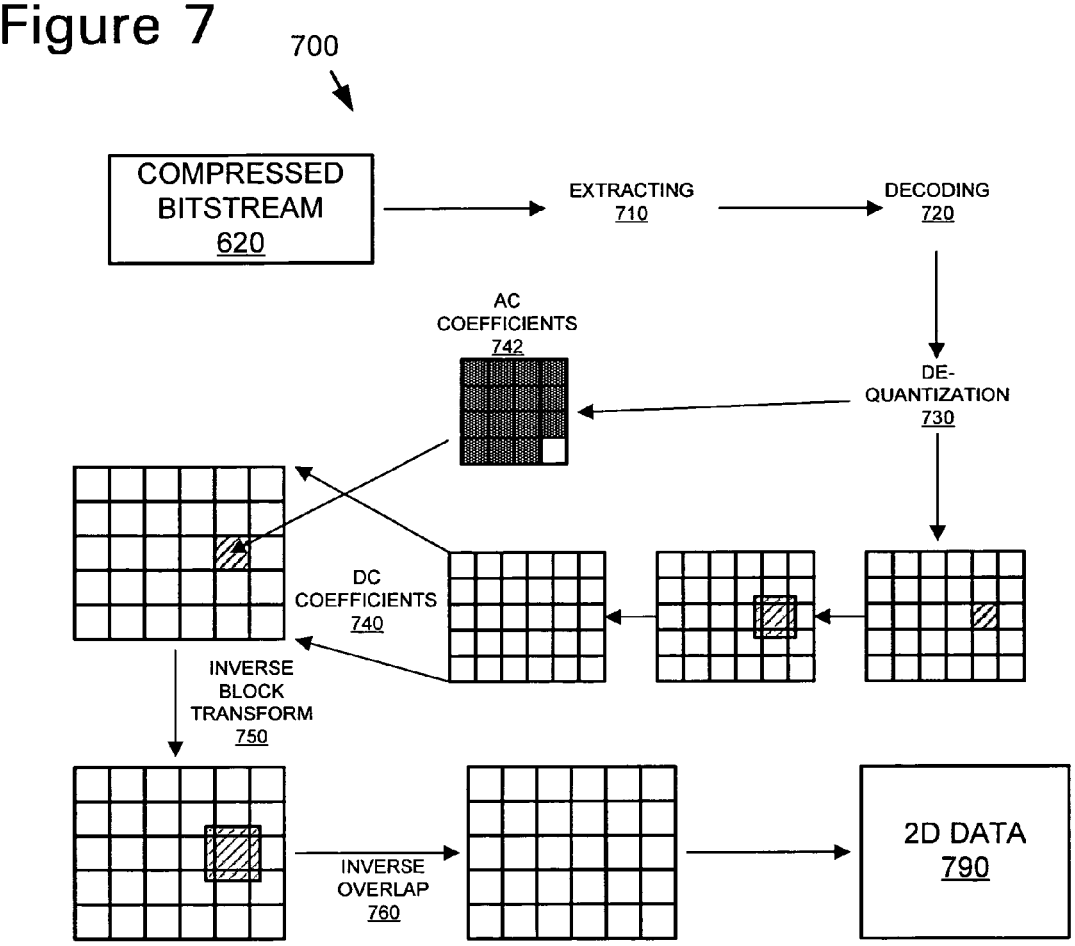
FIG. 7 is a flow diagram of an decoder based on the improved reversible 2D transform.

FIGS. 6 and 7 are a generalized diagram of the processes employed in a representative 2-dimensional (2D) data encoder 600 and decoder 700 based on the improved, reversible scale-free 2D transform 650 detailed below. The diagrams present a generalized or simplified illustration of the use and application of this transform in a compression system incorporating the 2D data encoder and decoder. In alternative encoders based on this transform, additional or fewer processes than those illustrated in this representative encoder and decoder can be used for the 2D data compression. For example, some encoders/decoders may also include color conversion, color formats, scalable coding, lossless coding, macroblock modes, etc. The improved 2D transform permits the compression system (encoder and decoder) to provide lossless and/or lossy compression of the 2D data, depending on the quantization which may be based on a quantization parameter varying from lossless to lossy.

The 2D data encoder 600 produces a compressed bitstream 620 that is a more compact representation (for typical input) of 2D data 610 presented as input to the encoder. For example, the 2D data input can be an image, a frame of a video sequence, or other data having two dimensions. The 2D data encoder tiles 630 the input data into macroblocks, which are 16×16 pixels in size in this representative encoder. The 2D data encoder further tiles each macroblock into 4×4 blocks 632. A "forward overlap" operator 640 is applied to each edge between blocks, after which each 4×4 block is transformed using the reversible scale-free transform 650. Subsequently, the DC coefficient 660 of each 4×4 transform block is subject to a similar processing chain (tiling, forward overlap, followed by 4×4 block transform). The resulting DC transform coefficients and the AC transform coefficients are quantized 670, entropy coded 680 and packetized 690.

The decoder performs the reverse process. On the decoder side, the transform coefficient bits are extracted 710 from their respective packets, from which the coefficients are themselves decoded 720 and dequantized 730. The DC coefficients 740 are regenerated by applying an inverse transform, and the plane of DC coefficients is "inverse overlapped" using a suitable smoothing operator applied across the DC block edges. Subsequently, the entire data is regenerated by applying the 4×4 inverse transform 750 to the DC coefficients, and the AC coefficients 742 decoded from the bitstream. Finally, the block edges in the resulting image planes are inverse overlap filtered 760. This produces a reconstructed 2D data output.

2. Implementation of the Improved, Reversible Scale-Free Transform

As described by, e.g., A. K. Jain, Fundamentals of Digital Image Processing, Prentice Hall, 1989, a separable 2D transform can be implemented as a 1D transform operating on the data ordered in 1D, producing a likewise ordered vector result. The equivalent transform matrix is generated by the Kronecker product of the pre- and post-multipliers used in the separable case. If x and y denote the data and transform vectors reordered from their 2D representation in (2), their relationship is given by the following $$y = \mathcal{T} x \quad (3)$$

where $\mathcal{T} = \mathrm{Kron}(T_1, T_2)$.

Although the separable implementation of a 2D transform shown in equation (2) is computationally more efficient (in an asymptotic sense) than in equation (3), there are certain cases where the latter representation leads to desirable properties. For instance, an implementation based on equation (3) has lower latency than in equation (2), due to a single stage matrix multiply (which is an operation supported natively on several digital signal processors (DSPs)). For the improved, reversible scale-free transform described herein, the 1D representation of 2×2 steps leads to a scale-free reversible structure.

Moreover, a separable 2D transform can be implemented as a cascade of simpler 1D transforms. Assume that the transform matrices $T_1$ and $T_2$ can be decomposed as follows $$T_1 = T_{1A} T_{1B} \quad (4)$$

$$T_2 = T_{2A} T_{2B}$$

Associativity of the matrix multiply operation can be used to reorder the 2D transform (2) as follows $$Y = T_1 \times T_2' \quad (5)$$
$$= (T_{1A} T_{1B}) \times (T_{2B}' T_{2A}')$$
$$= T_{1A} (T_{1B} \times T_{2B}') T_{2A}'$$

leading to the cascaded 1D implementation $$y = \mathrm{Kron}(T_{1A}, T_{2A}) \cdot \mathrm{Kron}(T_{1B}, T_{2B}) \cdot \alpha \quad (6)$$

Transforms such as the DCT can be formulated as a cascade of elementary 2 point rotation operations. The 2D DCT can be formulated using the structure of (6) to possess certain desirable properties, which will be described in detail further ahead.

A. 2D Hadamard Transform

The 2D Hadamard transform, implemented as a 1D operation is generated by the Kronecker product, $$\mathcal{T}_H = \mathrm{Kron}(T_H, T_H) = \frac{1}{2} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (7)$$

Figures 8, 9:
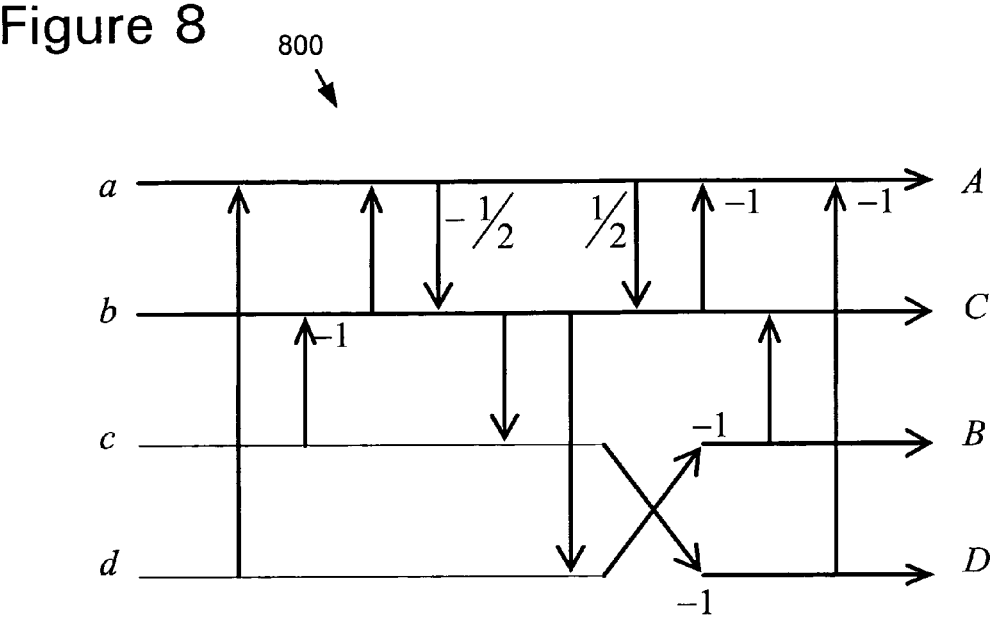
FIG. 8 is a signal flow graph of a normalized lifting-based implementation of the reversible 2×2 Hadamard transform.
FIG. 9 is a program listing in the C programming language for realizing the normalized reversible 2×2 Hadamard transform of FIG. 8.

Interestingly, it is possible to realize a scale-free reversible transform corresponding to equation (7), using only trivial lifting steps. An implementation of this form is shown as the signal flow graph 800 in FIG. 8. Corresponding C++ code eliminating some redundant operations is shown in FIG. 9. In this code listing 900, "swap(x,y)" is a function that exchanges the values of its arguments.

Figure 10:
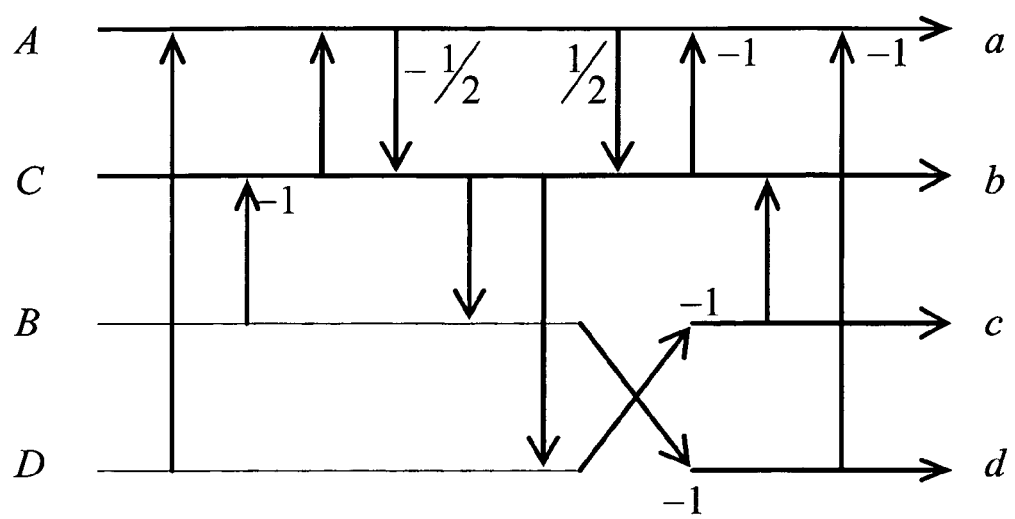
FIG. 10 is a signal flow graph of an inverse of the normalized reversible 2×2 Hadamard transform of FIG. 8.

From the foregoing, it can be seen that the normalized reversible 2D Hadamard transform can be formulated using only trivial lifting steps, although this is not possible for the arguably "simpler" 1D Hadamard case! Although the transform matrix itself is involutory (i.e., $\mathcal{T}_H$ is its own inverse), a lossless reconstruction requires that the lifting steps be carefully reversed so as to precisely reproduce any rounding effects. The inverse 1000 of the structure 800 in FIG. 8 is presented in FIG. 10—the structure 1000 is identical to the forward transform in this case. Note that the transform coefficients B and C are permuted in the signal flow graphs.

The reversible, scale-free 2D transform 650 in the encoder 600 of FIG. 6 uses an approximation to the 4×4 DCT. The following description demonstrates the entire transform process of the transform 650 can be realized as the cascade of three elementary 2×2 transform operations, which are the 2×2 Hadamard transform, and the following:

Odd rotate: $Y = T_R \times T_H'$

Odd-odd rotate: $Y = T_R \times T_R' \quad (8)$ where the two point rotation matrix $T_R$ is given by $$T_R = \frac{1}{\sqrt{4+2\sqrt{2}}} \begin{pmatrix} 1+\sqrt{2} & 1 \\ 1 & -(1+\sqrt{2}) \end{pmatrix} \quad (9)$$

1D implementations of equation (8) are obtained by computing the Kronecker product of the pre and post transform matrices (approximated to four decimal places)

$$\hat{\mathcal{T}}_{odd} = \mathrm{Kron}(T_R, T_H) = \begin{pmatrix} 0.6533 & 0.6533 & 0.2706 & 0.2706 \\ 0.6533 & -0.6533 & 0.2706 & -0.2706 \\ 0.2706 & 0.2706 & -0.6533 & -0.6533 \\ 0.2706 & -0.2706 & -0.6533 & 0.6533 \end{pmatrix} \quad (10)$$

and $$\hat{\mathcal{T}}_{odd-odd} = \mathrm{Kron}(T_R, T_R) = \begin{pmatrix} 0.8536 & 0.3536 & 0.3536 & 0.1464 \\ 0.3536 & -0.8536 & 0.1464 & -0.3536 \\ 0.3536 & 0.1464 & -0.8536 & -0.3536 \\ 0.1464 & -0.3536 & -0.3536 & 0.8536 \end{pmatrix} \quad (11)$$

The carat ^ indicates the desired transform matrix. The approximations resulting from actual implementations do not carry the carat. For the 2×2 Hadamard transform, the desired transform matrix and its approximation are identical. Therefore, $\mathcal{T}_H$ is used to denote the 2×2 Hadamard transform implemented in 1D, without any ambiguity. Next, we look at the lifting implementation of $\mathcal{T}_{odd}$ and $\mathcal{T}_{odd\text{-}odd}$.

B. Implementation of $\mathcal{T}_{odd}$

Figures 11, 12:
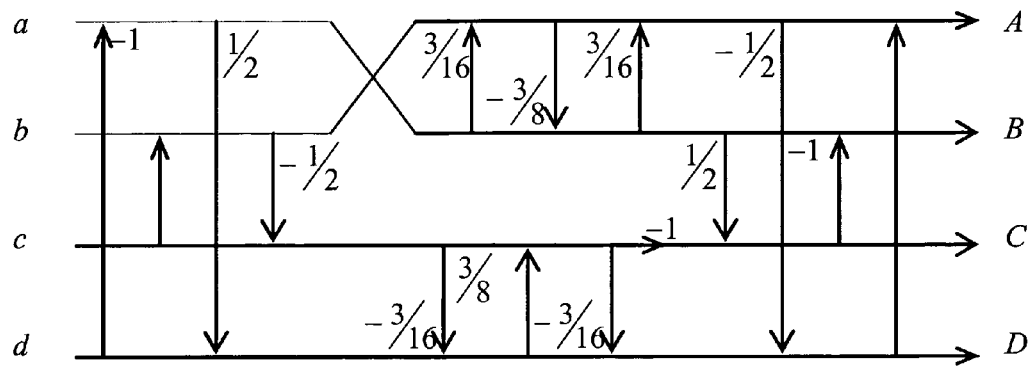
FIG. 11 is a signal flow graph of a normalized lifting-based implementation of the Todd transform.
FIG. 12 is a program listing in the C programming language for realizing the normalized $\mathcal{T}_{odd}$ transform of FIG. 11.

A scale-free, lifting based implementation of the $\mathcal{T}_{odd}$ transform 1100 is shown as a signal-flow graph in FIG. 11, and in a C++ code program listing 1200 in FIG. 12. It can be seen that the first and last lifting stages are identical to the Hadamard transform case. Besides trivial shears, two non-trivial lifting rotations are applied in the intermediate stages. Each non-trivial rotation is implemented in three steps, with a multiply by 3 and a bit shift by 3 or 4 bits. Therefore, $\mathcal{T}_{odd}$ can be realized in a reversible, scale-free manner by using 6 non-trivial lifting steps.

The resulting 1D transform matrix $\mathcal{T}_{odd}$ is shown below (12), which is in close conformance with the original formulation of $\mathcal{T}_{odd}$ in (10). It can be seen that the second and fourth rows of the resulting transform matrix sum to zero, which means that there is no leakage of DC into the AC bands. This desirable property is achieved although the required 2D rotations are merely approximated in the structure.

$$\mathcal{T}_{odd} = \begin{pmatrix} 0.6458 & 0.6458 & 0.2839 & 0.2839 \\ 0.6523 & -0.6523 & 0.2773 & -0.2773 \\ 0.2773 & 0.2773 & -0.6523 & -0.6523 \\ 0.2839 & -0.2839 & -0.6458 & 0.6458 \end{pmatrix} \quad (12)$$

Figure 13:
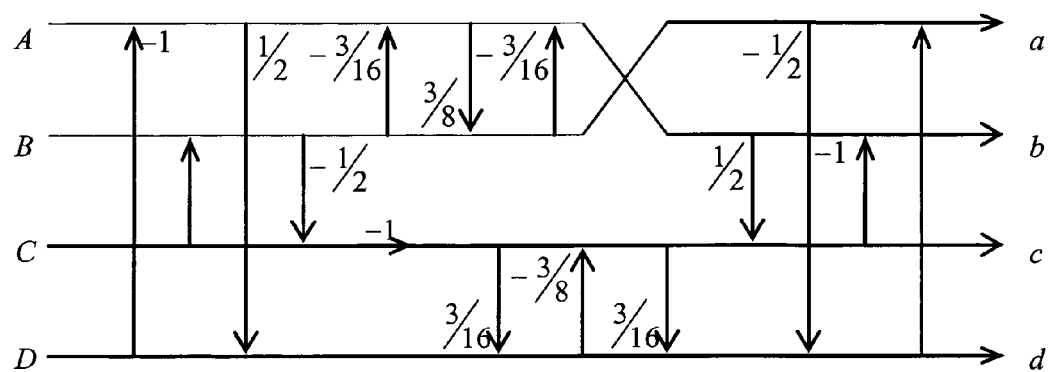
FIG. 13 is a signal flow graph of a normalized lifting-based version of the inverse of the $\mathcal{T}_{odd}$ transform of FIG. 11.

Although the transform matrix $\mathcal{T}_{odd}$ is involutory (i.e., is its own inverse), rounding errors do not cancel out in two successive applications of the signal flow graph or code. The lossless inverse of $\mathcal{T}_{odd}$ is derived by reversing the lifting steps, either in the signal flow graph or in the C++ code, to replicate forward transform side rounding errors. The signal flow graph of the inverse 1300 of $\mathcal{T}_{odd}$ is shown in FIG. 13—code can be derived likewise.

C. Implementation of $\mathcal{T}_{odd\text{-}odd}$

Figures 14, 15:
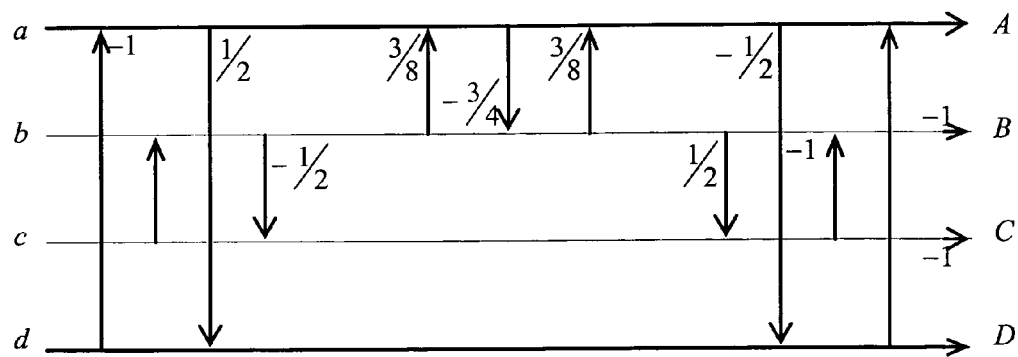
FIG. 14 is a signal flow graph of a normalized lifting-based implementation of the $\mathcal{T}_{odd\text{-}odd}$ transform.
FIG. 15 is a program listing in the C programming language for realizing the normalized $\mathcal{T}_{odd\text{-}odd}$ transform of FIG. 14.

The $\mathcal{T}_{odd\text{-}odd}$ transform 1400 is composed of two rotations, neither of which is a Hadamard transform. Interestingly, $\mathcal{T}_{odd\text{-}odd}$ can be realized with fewer non-trivial lifting steps than $\mathcal{T}_{odd}$. This is due to the symmetry properties of the Kronecker product of $T_R$ with itself. The signal flow graph of the $\mathcal{T}_{odd\text{-}odd}$ transform 1400 and program listing 1500 of its C++ code realization are shown in FIGS. 14 and 15, respectively.

It can be seen that only one non-trivial rotation, implemented by means of three non-trivial lifting steps is required to realize $\mathcal{T}_{odd\text{-}odd}$. This rotation corresponds to the scale-free 1D 2-point Hadamard transform.

$$\mathcal{T}_{odd\text{-}odd} = \begin{pmatrix} 0.8594 & 0.3223 & 0.3223 & 0.1406 \\ 0.3750 & -0.8594 & 0.1406 & -0.3750 \\ 0.3750 & 0.1406 & -0.8594 & -0.3750 \\ 0.1406 & -0.3223 & -0.3223 & 0.8594 \end{pmatrix} \quad (13)$$

Figure 16:
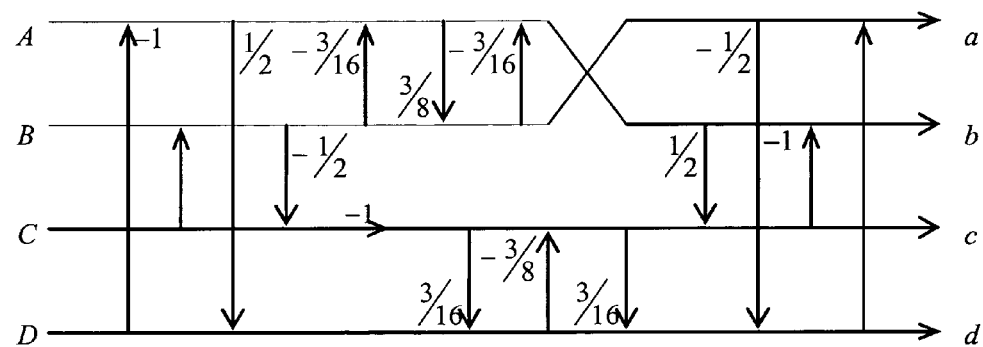
FIG. 16 is a signal flow graph of a normalized lifting-based version of the inverse of the $\mathcal{T}_{odd\text{-}odd}$ transform of FIG. 14.

As with the other transforms considered here, $\mathcal{T}_{odd\text{-}odd}$ as represented in equation (13) is involutory, though not a bit exact inverse of itself. The lossless inverse 1600 of $\mathcal{T}_{odd\text{-}odd}$ is obtained by reversing the signal flow graph used for the forward transform, as shown in FIG. 16.

D. Notation For and Derivation of Above 2×2 Transform Implementations

Figure 17:
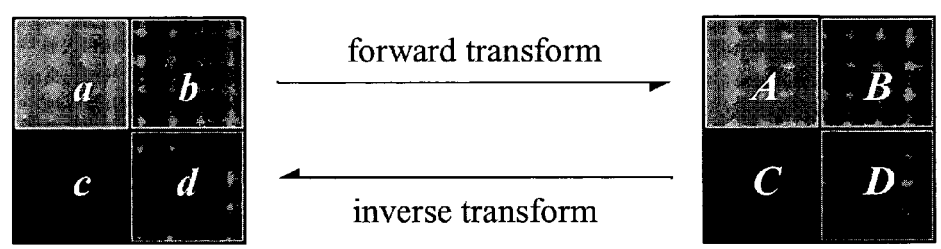
FIG. 17 is a diagram illustrating the ordering of 2×2 data in the depictions herein of transforms and inverse transform operations.

In the depictions herein of the reversible, scale-free 2D transform using these three reversible scale-free transforms, the following points apply. First, the ordering 1700 of the 2×2 data resulting in the above signal flow graphs and C++ code is as shown in FIG. 17. The spatial domain points are shown on the left, and corresponding frequency domain points on the right. Color coding using four gray levels to indicate the four data points is introduced here, to facilitate the reversible, scale-free 2D transform description that follows.

Often, 2 point transforms or rotations are defined as the following operation $$y = \begin{pmatrix} \cos\theta & \sin\theta \\ -\sin\theta & \cos\theta \end{pmatrix} x \quad (14)$$

instead of the involutory form $$y = \begin{pmatrix} \cos\theta & \sin\theta \\ \sin\theta & -\cos\theta \end{pmatrix} x \quad (15)$$

These two forms are essentially identical, since they differ only in sign of the second transform coefficient. The latter representation (15) is used here, although the entire derivation in this document is equally applicable to the former form (14).

The structure of the basic 2×2 transforms, $\mathcal{T}_H$, $\mathcal{T}_{odd}$ and $\mathcal{T}_{odd\text{-}odd}$, defined above are constructed by noting each two-point transform is a rotation. Further, the Kronecker product of two 2-point rotations is given as follows:

$$T = Kron\left(\begin{bmatrix} \cos\alpha & \sin\alpha \\ -\sin\alpha & \cos\alpha \end{bmatrix}, \begin{bmatrix} \cos\beta & \sin\beta \\ -\sin\beta & \cos\beta \end{bmatrix}\right) \quad (16)$$

We then define an operator H as follows:

$$H = \begin{bmatrix} 1 & 0 & 0 & 0 \\ 0 & 1 & 0 & 0 \\ 0 & 1/2 & 1 & 0 \\ -1/2 & 0 & 0 & 1 \end{bmatrix} \cdot \begin{bmatrix} 1 & 0 & 0 & 1 \\ 0 & 1 & -1 & 0 \\ 0 & 0 & 1 & 0 \\ 0 & 0 & 0 & 1 \end{bmatrix} \quad (17)$$

H represents a non-normalized double butterfly operation and can be efficiently implemented using lifting.

The following factorization holds:

$$H \cdot Kron\left(\begin{bmatrix} \cos\alpha & \sin\alpha \\ -\sin\alpha & \cos\alpha \end{bmatrix}, \begin{bmatrix} \cos\beta & \sin\beta \\ -\sin\beta & \cos\beta \end{bmatrix}\right) \cdot H^{-1} =$$

$$\begin{bmatrix} \cos(\alpha-\beta) & -\sin(\alpha-\beta) & 0 & 0 \\ \sin(\alpha-\beta) & \cos(\alpha-\beta) & 0 & 0 \\ 0 & 0 & \cos(\alpha+\beta) & \sin(\alpha+\beta) \\ 0 & 0 & -\sin(\alpha+\beta) & \cos(\alpha+\beta) \end{bmatrix}$$

Based on this, a Kronecker product of the type T can be implemented as a cascade of 3 stages:

A. A double butterfly operation defined by H using lifting steps.
B. 2 point rotations between the first pair of components, and between the second pair of components, and
C. The reverse of the double butterfly performed in step a.

Figure 25:
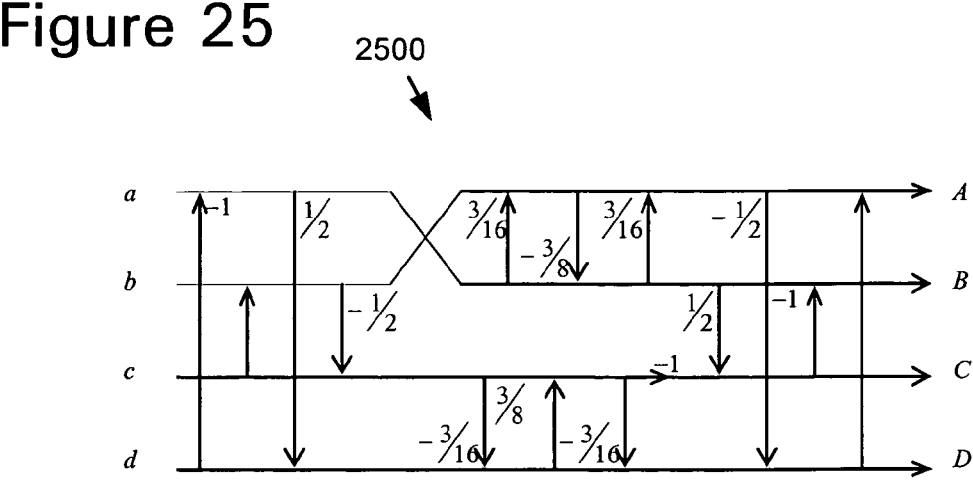
FIG. 25 is a signal flow graph of a structure for the normalized lifting-based implementation of the reversible 2×2 transforms shown in FIGS. 11 and 14.

For the special case $\mathcal{T}_H$ an even simpler decomposition exists, which is shown as the signal flow graph 800 in FIG. 8 and described above. For the other cases (e.g., $\mathcal{T}_{odd}$ and $\mathcal{T}_{odd\text{-}odd}$), the resulting structure can be generalized as the flow graph 2500 shown in FIG. 25.

Looking at the three signal flow graphs of the transforms described above (and also their inverses), observe a fundamental similarity in their structure. The first stage of the transform is a lifting operation between the a-d and b-c coefficients. Likewise, the last stage is the inverse lifting process (discounting sign and coefficient exchanges). Correspondingly, the first stage of the inverse transform is a lifting operation between A and D, and also between B and C, with the reverse operation in the last stage. The lifting steps between the diagonal elements is a distinguishing feature of the combined 2D 2×2 transform presented here.

The next section discusses the construction of a lossless, scale-free transform, which approximates the 4×4 DCT/IDCT. Although an exemplary embodiment of the transform is presented in this detailed technical discussion, the same procedure, with the additional definition of other 2×2 elementary reversible lifting based transforms, can be used to generate higher dimensional reversible transform embodiments with desirable properties.

E. Lossless, Scale-Free Transform

The 4-point DCT can be reduced to a sequence of four butterfly operations as shown in the signal flow graph of FIG. 3. The first stage consists of two butterflies performing 2-point Hadamard operations on the input data (i.e., one 2-point Hadamard of input data indices 0 and 3; and a second of input indices 1 and 2). The second stage comprises a 2 point Hadamard operation on the low pass results of the first stage to generate the even frequency components (indices 0 and 2), and a 2 point rotation by π/8 to generate the odd frequency components (indices 1 and 3).

In two dimensions, the DCT can be implemented separably: a vertical 1D 4-point DCT of each column of the 4×4 input data; followed by a horizontal 1D 4-point DCT of the rows (or vice versa). This is depicted as a separable DCT implementation 1800 in FIG. 18. Alternatively, the two 1D DCT stages described above can be interleaved between the horizontal and vertical, using the theory of equation (5), as shown as an interleaved DCT implementation 1900 in FIG. 19.

Moreover, when the above approach is followed, the corresponding horizontal and vertical stages can be further combined. For instance, the first stage is a 2 point Hadamard transform on the "inner" and "outer" input elements. The horizontal and vertical stages may be merged into 4 applications of the 2×2 2D Hadamard transform on the 16 input data elements, each transform being applied to a symmetric set of input points. Likewise, the second stage horizontal and vertical steps can be coalesced into a 2×2 Hadamard transform and three 2×2 transforms, two of which are transposes. Observe that the latter three 2×2 transforms are indeed 2D remappings of $\mathcal{T}_{odd}$ and $\mathcal{T}_{odd\text{-}odd}$ defined earlier.

More particularly, the reversible scale-free 2D transform 650 (FIG. 6) is implemented by so re-arranging the transform operations into an arrangement of the 2×2 Hadamard, $\mathcal{T}_{odd}$ and $\mathcal{T}_{odd\text{-}odd}$ transforms. The two stages of this transform 650 are performed as shown in FIGS. 20 and 21, respectively. Each stage consists of four 2×2 transforms which may be done in any arbitrary sequence, or concurrently, within the stage.

For the inverse 2D transform 750 (FIG. 7), the stages are reversed in order, and the steps within each stage of transformation use the inverse of the steps in the forward transform process. As noted earlier, the reversible 2×2 Hadamard transform $\mathcal{T}_H$ is its own inverse, in a bit exact or lossless sense. Therefore, the second stage of the inverse Photon transform is merely the first stage of the forward Photon transform, as shown in FIG. 20. The first stage 2200 of the inverse Photon transform is depicted in FIG. 22. The four steps within this stage (which, as for the forward transform case, may be executed in arbitrary order or concurrently) apply the inverses of $\mathcal{T}_H$, $\mathcal{T}_{odd}$ and $\mathcal{T}_{odd\text{-}odd}$ as defined earlier, and remapped back to a 2D 2×2 space.

Upon following the steps of the forward improved 2D transform shown in FIGS. 20 and 21, the resulting transform coefficients are ordered as shown in FIG. 23. The same ordering 2300 is assumed for the coefficients being inverse transformed using steps in FIGS. 22 and 20, in that order.

The above described improved implementation of the forward 2D transform 650 consists of five applications of $\mathcal{T}_H$, two applications of $\mathcal{T}_{odd}$ and one application of $\mathcal{T}_{odd\text{-}odd}$ to each 4×4 block. The same number of applications of these transforms are involved in the implementation of the inverse 2D transform 750. Accordingly, the total number of nontrivial lifting steps is 5×0+2×6+1×3=15 for each block, to realize the lossless forward or inverse 2D transform. This is about 1 nontrivial step per pixel. A nontrivial step is an operation of the form (3×x+r)>>k, where x is the operand, r and k are constants determining rounding and bit shift. k is either 2, 3 or 4. Likewise, there are 17 single-place right shifts (i.e. x>>1) per block. Additions, subtractions and negations are not counted in this overview.

Figure 18:
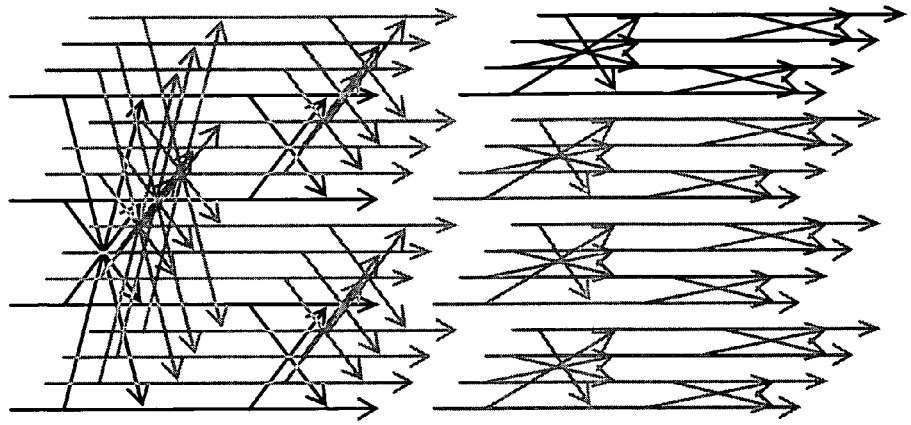
FIG. 18 is a signal flow graph illustrating a 2D DCT implemented separably as a 1D vertical DCT and a 1D horizontal DCT applied to columns and rows, respectively, of a 4×4 data input.
Figure 19:
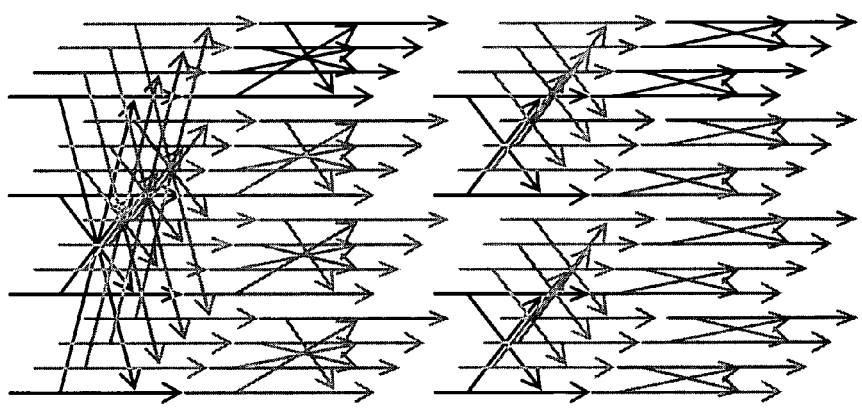
FIG. 19 is a signal flow graph illustrating the reversible, scale-free 2D transform implemented by interleaving horizontal and vertical transform operations in two stages.

In comparison, consider the separable implementation 1800 of the 2D DCT illustrated in FIG. 18. Assume that each 4 point DCT is implemented using three 2 point normalized Hadamard operations as shown in FIG. 3, and the rotation by π/8 is implemented using three nontrivial lifting steps. The total number of nontrivial lifting operations per 4×4 block for either the forward or the inverse transform is 2×4×3=24. The total number of single-place right shifts is also 24. These numbers are about 50% higher than the improved forward transform 650 and inverse transform 750 implementations, not counting the fact that the resulting transform produces basis functions with norms in the range ¼ through 2 (or through 4 if irrational range basis functions are avoided). In contrast, all basis functions of the improved transform 650 are unit norm.

F. Improved Transform for 4:2:0 Colorspace

In one example implementation of the encoder 600 (FIG. 6) and decoder 700 (FIG. 7), the YUV 4:2:0 colorspace is used to represent the color of pixels in an image (or video frame). In this example codec, a macroblock in the YUV 4:2:0 colorspace is defined as a 16×16 tile of pixels in the luminance (Y) channel, and 8×8 tiles in the chrominance (U and V) channels. These are further divided into 4×4 blocks that are transform coded using the above-described transform 650. The 4×4 transform 650 is applied to the DC coefficients of the luminance channels. However, only 2×2 samples of chrominance are available within a macroblock. The example codec then applies $\mathcal{T}_H$, which as described earlier is a reversible scale-free 2×2 Hadamard transform, to the DC chrominance values within each macroblock. Thus, the macroblock structure of the example codec format is preserved, and no additional transforms need to be introduced in the codec for handling the 4:2:0 format.

G. Minimizing Rounding Errors

Rounding errors are introduced in the lifting steps of the $\mathcal{T}_H$, $\mathcal{T}_{odd}$ and $\mathcal{T}_{odd-odd}$ transforms that involve a right bit-shift. These rounding errors have a known bias, and can build up over the course of the transform. For instance, it is known that a step of the form x+=(y>>1) leads to a bias of −¼ in the value of x, compared to its mathematical equivalent x:=x+y/2. This is because (y>>1) is a division by 2 rounded down, which is exact if y is even, and off by ½ if y is odd. Probabilistically therefore, it is biased by −¼. Rounding errors are unavoidable in integer-to-integer transforms involving lifting, but it is desirable to minimize the bias in the overall system.

The formulations of $\mathcal{T}_H$, $\mathcal{T}_{odd}$ and $\mathcal{T}_{odd-odd}$ shown earlier as C++ code snippets add varying factors to operands being divided or right bit-shifted. These factors are chosen so as to minimize the bias. In particular, the bias in the four transform coefficients after the first stage operation of $\mathcal{T}_H$ (to an unbiased input) using the C++ code listing 900 in FIG. 9 can be shown to be [¼–¼–¼–¼]. The second stage application of $\mathcal{T}_H$ in the improved 2D transform 650 (FIG. 6) operates on the DC values of the first stage, i.e. on coefficients which are already biased to ¼. The result of the second stage operation produces a bias of [¾–¼–¼–¼]. Since the first coefficient is the DC of DC, it is expected to be large and the relatively high bias of ¾ does not affect coding performance.

The nontrivial lifting steps in $\mathcal{T}_{odd}$ and $\mathcal{T}_{odd-odd}$ provide freedom to choose rounding factors for minimizing transform bias. The C++ code listing 1500 (FIG. 15) for $\mathcal{T}_{odd-odd}$ shows that sometimes off-center rounding rules (such as a+=(3 b+5)>>3) lead to smaller overall bias, especially when the input data is itself biased. For the improved 2D transform steps $\mathcal{T}_{odd}$ and $\mathcal{T}_{odd-odd}$, all inputs are biased to −¼.

Typically, the definition of a codec is restricted to a definition of the bitstream decoder. An exception to this rule is made for lossless codecs, since the encoder and decoder must be in perfect match for the input data to be reconstructed with no loss. In the case of a lossy-to-lossless codec, it is defined on both the encoder and decoder sides. However, when the encoder is operated in a purely lossy mode, some shortcuts or enhancements may be possible that can give better performance (in terms of rate-distortion, or computational cycle count) than the baseline performance as defined in the codec specification.

One means of improving encoder performance relates to transform coefficient bias. It is possible to reduce the effect of bias in some embodiments of the encoder 600/decoder 700 by carrying out the following procedure for each 4×4 block:

1. Scale up the 4×4 block by multiplying by m=$_2$k (typically m=4 works well).
2. Perform the improved 2D transform 650 on the block.
3. Quantize the block using a quantizer which is m times the original desired quantization parameter (for instance, use a quantization factor (QP) of 32 if the desired QP is 8 and m=4 in step 1).

There is no change on the decoder 700 side, yet better PSNR numbers are possible at the same bitrate. Of course, this does not work for lossless encoding.

3. Computing Environment

The above described codec with improved reversible, scale-free 2D transform can be performed on any of a variety of devices in which digital media signal processing is performed, including among other examples, computers; image and video recording, transmission and receiving equipment; portable video players; video conferencing; and etc. The digital media coding techniques can be implemented in hardware circuitry, as well as in digital media processing software executing within a computer or other computing environment, such as shown in FIG. 24.

Figure 24:
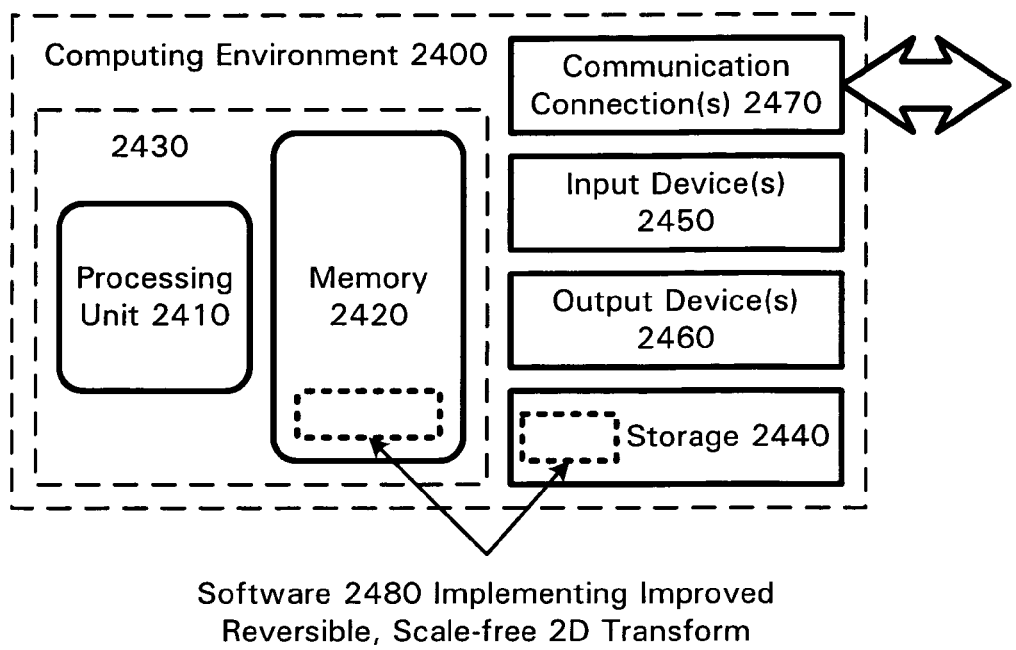
FIG. 24 is a block diagram of a suitable computing environment for implementing the block transform-based codec with improved spatial-domain lapped transform of FIGS. 6 and 7.

FIG. 24 illustrates a generalized example of a suitable computing environment (2400) in which described embodiments may be implemented. The computing environment (2400) is not intended to suggest any limitation as to scope of use or functionality of the invention, as the present invention may be implemented in diverse general-purpose or special-purpose computing environments.

With reference to FIG. 24, the computing environment (2400) includes at least one processing unit (2410) and memory (2420). In FIG. 24, this most basic configuration (2430) is included within a dashed line. The processing unit (2410) executes computer-executable instructions and may be a real or a virtual processor. In a multi-processing system, multiple processing units execute computer-executable instructions to increase processing power. The memory (2420) may be volatile memory (e.g., registers, cache, RAM), non-volatile memory (e.g., ROM, EEPROM, flash memory, etc.), or some combination of the two. The memory (2420) stores software (2480) implementing the described encoder/decoder and transforms.

A computing environment may have additional features. For example, the computing environment (2400) includes storage (2440), one or more input devices (2450), one or more output devices (2460), and one or more communication connections (2470). An interconnection mechanism (not shown) such as a bus, controller, or network interconnects the components of the computing environment (2400). Typically, operating system software (not shown) provides an operating environment for other software executing in the computing environment (2400), and coordinates activities of the components of the computing environment (2400).

The storage (2440) may be removable or non-removable, and includes magnetic disks, magnetic tapes or cassettes, CD-ROMs, CD-RWs, DVDs, or any other medium which can be used to store information and which can be accessed within the computing environment (2400). The storage (2440) stores instructions for the software (2480) implementing the codec with improved SDLT.

The input device(s) (2450) may be a touch input device such as a keyboard, mouse, pen, or trackball, a voice input device, a scanning device, or another device that provides input to the computing environment (2400). For audio, the input device(s) (2450) may be a sound card or similar device that accepts audio input in analog or digital form, or a CD-ROM reader that provides audio samples to the computing environment. The output device(s) (2460) may be a display, printer, speaker, CD-writer, or another device that provides output from the computing environment (2400).

The communication connection(s) (2470) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (2400), computer-readable media include memory (2420), storage (2440), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

I claim:

1. A method of processing 2-dimensional digital media data for data compression encoding or decoding, the method comprising:
   receiving input of the 2-dimensional digital media data;
   performing a block transform-based data compression encoding or decoding of the digital media data using a reversible, scale-free 2-dimensional block transform defined as a 1-dimensional transform applied horizontally and vertically on a 2-dimensional block of the digital media data, wherein said transform of the 2-dimensional block of the digital media data is realized by, in each of two or more stages interleaving operations from the horizontal and vertical 1-dimensional transforms, applying the operations in the respective stage re-arranged as a set of elementary transforms implemented as lifting steps to independent subsets of values in the 2-dimensional block; and
   outputting the encoded or decoded digital media data.

2. The method of claim 1 further comprising in a first of the stages, applying a 2×2 Hadamard transform to independent 4-value subsets in the 2-dimensional block of values.

3. The method of claim 2 wherein the 4-value subsets comprise:
   a group of four values at corners of the 2-dimensional block;
   a group of four values in a center of the 2-dimensional block;
   a group of four values at horizontal edge centers of the 2-dimensional block; and
   a group of four values at vertical edge centers of the 2-dimensional block.

4. The method of claim 1 further comprising in a second of the stages, applying a set of transforms to independent 4-value subsets in the 2-dimensional block of values, at least one of the set of transforms being implemented in the form of a cascade of three stages, comprising:
   a double butterfly operation defined by operator H using lifting steps, where $$H = \begin{bmatrix} 1 & 0 & 0 & 0 \\ 0 & 1 & 0 & 0 \\ 0 & 1/2 & 1 & 0 \\ -1/2 & 0 & 0 & 1 \end{bmatrix} \cdot \begin{bmatrix} 1 & 0 & 0 & 1 \\ 0 & 1 & -1 & 0 \\ 0 & 0 & 1 & 0 \\ 0 & 0 & 0 & 1 \end{bmatrix};$$

2-point rotations between a first pair of component values, and between a second pair of component values, respectively; and
   a reverse of the double butterfly operation.

5. The method of claim 1 further comprising in a second of the stages, applying a set of transforms to independent 4-value subsets in the 2-dimensional block of values, the set of transforms including a 2×2 Hadamard transform, a 2×2 odd rotate transform derived as a Kronecher product of a 2-point Hadamard transform and a two point rotation matrix, and a 2×2 odd-odd rotate transform derived as a Kronecher product of the two point rotation matrices.

6. The method of claim 1 with reduction of rounding error bias, the method further comprising:
   for a butterfly operation involving a division or right-bit-shift, adding a varying factor to operands being divided or right bit-shifted prior to the respective butterfly operation.

7. The method of claim 1 with reduction of rounding error bias for lossy compression, the method further comprising:
   prior to the transform, scaling the 2-dimensional block by multiplying by a factor;
   performing the transform; and
   quantizing the resulting transform coefficients by a quantizer equal to a desired quantizer multiplied by the factor.

8. A method of performing an inverse of the 2-dimensional transform of claim 1, the method of performing the inverse comprising, in each of two or more stages interleaving operations from the horizontal and vertical 1-dimensional transforms, applying the operations in the respective stage re-arranged as a set of elementary transforms implemented as lifting steps to independent subsets of values in the 2-dimensional block.

9. The method of claim 8 further comprising in a first of the stages, applying a set of transforms to independent 4-value subsets in the 2-dimensional block of values, the set of transforms including a 2×2 Hadamard transform, a 2×2 odd rotate transform derived as a Kronecher product of a 2-point Hadamard transform and a two point rotation matrix, and a 2×2 odd-odd rotate transform derived as a Kronecher product of the two point rotation matrices.

10. The method of claim 9 wherein the 4-value subsets comprise groups of four values at top left, top right, bottom left and bottom right of the 2-dimensional block.

11. The method of claim 9 wherein the 2×2 Hadamard transform, 2×2 odd rotate transform, and 2×2 odd-odd rotate transform are given by the following equations, approximated to four decimal places:

$$\mathcal{J}_H = Kron(T_H, T_H) = \frac{1}{2}\begin{pmatrix} 1 & 1 & 1 & 1 \\ 1 & -1 & 1 & -1 \\ 1 & 1 & -1 & -1 \\ 1 & -1 & -1 & 1 \end{pmatrix},$$

$$\mathcal{J}_{odd} = \begin{pmatrix} 0.6458 & 0.6458 & 0.2839 & 0.2839 \\ 0.6523 & -0.6523 & 0.2773 & -0.2773 \\ 0.2773 & 0.2773 & -0.6523 & -0.6523 \\ 0.2839 & -0.2839 & -0.6458 & 0.6458 \end{pmatrix}, \text{and}$$

$$\mathcal{J}_{odd-odd} = \begin{pmatrix} 0.8594 & 0.3223 & 0.3223 & 0.1406 \\ 0.3750 & -0.8594 & 0.1406 & -0.3750 \\ 0.3750 & 0.1406 & -0.8594 & -0.3750 \\ 0.1406 & -0.3223 & -0.3223 & 0.8594 \end{pmatrix}.$$

12. The method of claim 8 further comprising in a second of the stages, applying a 2×2 Hadamard transform to independent 4-value subsets in the 2-dimensional block of values.

13. An encoder of a lossy/lossless compression system for performing lossy/lossless compression of 2-dimensional digital media data with block transform-based coding using a reversible, scale-free 2-dimensional transform defined as a 4-point transform applied vertically and horizontally to 2-dimensional blocks of the digital media data, the encoder comprising:

a buffer memory for buffering 2-dimensional digital media data to be encoded;

a processor for applying the transform to 2-dimensional blocks of the digital media data by, in each of two or more stages interleaving operations from the horizontal and vertical 1-dimensional 4-point transform, applying the operations in the respective stage re-arranged as a set of elementary 2×2 transforms implemented as lifting steps to independent 4 value subsets in the 2-dimensional block;

the processor further for entropy encoding transform coefficients produced by said transform of the 2-dimensional block.

14. The encoder of claim 13 wherein the elementary transforms comprise a 2×2 Hadamard transform, a 2×2 odd rotate transform derived as a Kronecher product of a 2-point Hadamard transform and a two point rotation matrix, and a 2×2 odd-odd rotate transform derived as a Kronecher product of the two point rotation matrices.

15. The encoder of claim 13 wherein the processor in a first stage applies a 2×2 Hadamard transform to 4 value subsets of the respective digital media block including 4 value sets at corners, center, top/bottom edges, and left-right edges of the digital media block.

16. The encoder of claim 13 wherein the processor in a second stage applies a 2×2 Hadamard transform to a 4-value subset at top left of the respective digital media block, a 2×2 Hadamard transform, a 2×2 odd rotate transform derived as a Kronecher product of the 2×2 Hadamard transform and a two point rotation matrix to 4-value subsets at top-right and bottom-left of the respective digital media block, and a 2×2 odd-odd rotate transform derived as a Kronecher product of the two point rotation matrix with itself to a 4-value subset at bottom-right of the respective digital media block.

17. A decoder of the lossy/lossless compression system of claim 13 for performing lossy/lossless decompression of the compressed 2-dimensional digital media data with block transform-based decoding using an inverse of the reversible, scale-free 2-dimensional transform, the decoder comprising:

a buffer memory for buffering transform coefficients of blocks of the compressed 2-dimensional digital media data;

a processor for entropy decoding the transform coefficients of said blocks, and for applying the inverse transform to 2-dimensional blocks of the digital media data by, in each of two or more stages interleaving operations from the horizontal and vertical 1-dimensional 4-point inverse transform, applying the operations in the respective stage re-arranged as a set of elementary 2×2 transforms implemented as lifting steps to independent 4 value subsets in the 2-dimensional block.

18. The decoder of claim 17 wherein the elementary transforms comprise a 2×2 Hadamard transform, a 2×2 odd rotate transform derived as a Kronecher product of a 2-point Hadamard transform and a two point rotation matrix, and a 2×2 odd-odd rotate transform derived as a Kronecher product of the two point rotation matrices.

19. The decoder of claim 18 wherein the processor in a first stage applies a 2×2 Hadamard transform to a 4-value subset at top left of the respective digital media block, a 2×2 Hadamard transform, a 2×2 odd rotate transform derived as a Kronecher product of a 2-point Hadamard transform and a two point rotation matrix to 4-value subsets at top-right and bottom-left of the respective digital media block, and a 2×2 odd-odd rotate transform derived as a Kronecher product of the two point rotation matrices to a 4-value subset at bottom-right of the respective digital media block.

20. The decoder of claim 18 wherein the processor in a second stage applies a 2×2 Hadamard transform to 4 value subsets of the respective digital media block including 4 value sets at corners, center, top/bottom edges, and left-right edges of the digital media block.

* * * * *